(12) United States Patent
Kurosawa (10) Patent No.: US 7,529,476 B2
(45) Date of Patent: May 5, 2009

(54) DIGITAL CAMERA

(75) Inventor: Yuichi Kurosawa, Tokyo (JP)

(73) Assignee: Hoya Corporation, Tokyo (JP)

( * ) Notice: Subject to any disclaimer, the term of this patent is extended or adjusted under 35 U.S.C. 154(b) by 377 days.

(21) Appl. No.: 11/334,499

(22) Filed: Jan. 19, 2006

(65) Prior Publication Data

US 2006/0164516 A1 Jul. 27, 2006

(30) Foreign Application Priority Data

Jan. 21, 2005 (JP) ............................. 2005-013881

(51) Int. Cl.
*G03B 17/00* (2006.01)
(52) U.S. Cl. ..................... 396/55; 348/208.7
(58) Field of Classification Search ............. 396/52–54, 396/55; 348/208.99–208.2, 208.4, 208.5, 348/208.7, 208.11
See application file for complete search history.

(56) References Cited

U.S. PATENT DOCUMENTS

| 2002/0112543 | A1* | 8/2002 | Noguchi .................... 73/618 |
| 2005/0024529 | A1 | 2/2005 | Kurosawa |
| 2005/0025479 | A1 | 2/2005 | Kurosawa |
| 2005/0162538 | A1 | 7/2005 | Kurosawa |
| 2006/0017815 | A1* | 1/2006 | Stavely et al. ............ 348/208.7 |
| 2006/0056829 | A1* | 3/2006 | Hirota et al. ................. 396/54 |

FOREIGN PATENT DOCUMENTS

| JP | 2001-245199 | 9/2001 |
| JP | 2003-084328 | 3/2003 |

OTHER PUBLICATIONS

English language abstract of JP 2003-084328.

* cited by examiner

*Primary Examiner*—W. B. Perkey
*Assistant Examiner*—Autumn Parker
(74) *Attorney, Agent, or Firm*—Greenblum & Bernstein, P.L.C.

(57) ABSTRACT

A digital camera including a detecting system to detect a vibration that occurs in a camera body, an image capturing element drive system, which is adapted to adjust a position of an image capturing element based on an amount of the vibration detected with respect to an optical axis of the camera body is provided. The image capturing element drive system includes a substrate, of which surface is perpendicular to the optical axis, an image capturing element board, which has the image capturing element thereon and is adapted to be driven in parallel with the surface of the substrate with a plurality of rolling support systems provided to the image capturing element board, a biasing system, which is adapted to bias the image capturing element board in a predetermined direction, and a drive system, which is adapted to drive the image capturing element board against biasing force of the biasing system.

14 Claims, 8 Drawing Sheets

DIGITAL CAMERA

BACKGROUND OF THE INVENTION

The present invention relates to a digital camera having an image capturing element, and specifically to a digital camera having a vibration reduction system.

In recent years, the number of pixels in an image capturing element for a digital camera has been increased, for example up to six million, or more. As the number of the pixels increased, a pixel pitch in the image capturing element has been narrowed. With such an image capturing element, when an ISO sensitivity of the image capturing element is lowered, a captured image is often blurred by hand movements of a user specifically when the image is captured using a telephoto lens. In order to prevent such an image from becoming blurred, an example of a technique for a digital camera to reduce vibration caused by such hand movements is disclosed in Japanese Patent Provisional Publication No. P2001-245199which discloses a digital camera to detect the vibration and compensate the vibration by driving the image capturing element horizontally and vertically in directions of the vibration detected for an amount corresponding to the vibration. In the disclosure, no specific configuration to drive the image capturing element is disclosed, however, for example a movable table to have the image capturing element thereon that can be driven in an X direction (i.e., horizontally) and a Y direction (i.e., vertically) respectively may be employed. For another example, a parallel wire mechanism, which is generally employed in an optical head of an optical disk device, with four resilient wires to movably support the image capturing element may be employed. Further, a drive mechanism with a ball screw, which is adapted to drive the image capturing element by using rotary force of a rotary drive source such as a voice coil motor, a DC (direct current) motor, and a step motor, may be employed. The drive mechanism with the ball screw may be also employed to drive one of a plurality of lenses in a photographing lens unit of a camera horizontally and vertically. An example of such camera is disclosed in Japanese Patent Provisional Publication No. 2003-84328.

However, each of the above-described drive mechanisms contains a problem. The movable table requires a plurality of guide bars and a table itself, which take space and prevent the camera from being downsized. In the parallel wire mechanism, the image capturing element supported by the resilient wires is often misaligned in a direction of an optical axis by a small amount, when the resilient wires are deformed to drive the image capturing element, thus an image captured may not be properly focused. Specifically, when a lens that allows more quantity of light to pass through with an aperture value for example f/1.4 is used, the blur of the image may be apparent and recognized by the user. In the ball screw mechanism, the image capturing element cannot be driven by a large amount with respect to a rotation angle of the motor, therefore the image capturing element may not be driven speedily enough to compensate the vibration.

SUMMARY OF THE INVENTION

The present invention is advantageous in that a digital camera capable of compensating vibration caused by hand movements promptly and focusing properly in a compact configuration is provided.

According to some aspects of the present invention, there is provided a digital camera including a detecting system to detect a vibration that occurs in a camera body, an image capturing element drive system, which is adapted to adjust a position of an image capturing element based on an amount of the vibration detected with respect to an optical axis of the camera body. The image capturing element drive system includes a substrate, of which surface is perpendicular to the optical axis, an image capturing element board, which has the image capturing element thereon and is adapted to be driven in parallel with the surface of the substrate with a plurality of rolling support systems provided to the image capturing element board, a biasing system, which is adapted to bias the image capturing element board in a predetermined direction, and a drive system, which is adapted to drive the image capturing element board against biasing force of the biasing system.

Optionally, each of the rolling support systems may include a ball bearing, which is supported by one of the substrate and the image capturing element board. The ball bearing may have a ball that is in rolling contact with the other of the substrate and the image capturing element board.

Optionally, the biasing system may include a pair of magnets, each of which is provided to the substrate and the image capturing element board, and is arranged in an opposed position to each other. The magnets may generate the biasing force, which is one of force to attract each other and force to repel each other. One of the magnets may be arranged in a position that is shifted in the predetermined direction with respect to the other of the magnets.

Optionally, the biasing system may be adapted to generate the biasing force in an oblique direction with respect to a horizontal direction and to a vertical direction of the camera body. The drive system may include a pair of actuators that are adapted to drive the image capturing element board in the horizontal direction and in the vertical direction respectively.

Optionally, each of the pair of actuators may be installed on the substrate and formed with a plurality of piezoelectric actuators. Each of the pair of actuators is connected to the image capturing element board via a displacement magnifying link.

Optionally, the displacement magnifying link may be formed with a cutout portion of the substrate.

Optionally, the image capturing element board may be provided with a dust-protection member made of vibration-proof material. The dust-protection member may be arranged to enclose the image capturing element therewith and to exclude the rolling support system and the biasing system therefrom.

Optionally, the dust-protection member may be configured to connect the image capturing element board and the substrate, and to be elastically deformed to have the image capturing element board driven in parallel with the surface of the substrate.

According to some aspects of the present invention, there is provided an image capturing element drive system for an optical device, which is adapted to adjust a position of an image capturing element of the device based on an amount of a vibration detected in the device with respect to an optical axis of a device body. The image capturing element drive system includes a substrate, of which surface is perpendicular to the optical axis, an image capturing element board, which has the image capturing element thereon and is adapted to be driven in parallel with the surface of the substrate with a plurality of rolling support systems provided to the image capturing element board, a biasing system, which is adapted to bias the image capturing element board in a predetermined direction, and a drive system, which is adapted to drive the image capturing element board against biasing force of the biasing system.

DETAILED DESCRIPTION OF THE EMBODIMENT

Referring to the accompanying drawings, a digital camera according to an embodiment of the invention will be described in detail.

Figure 1:
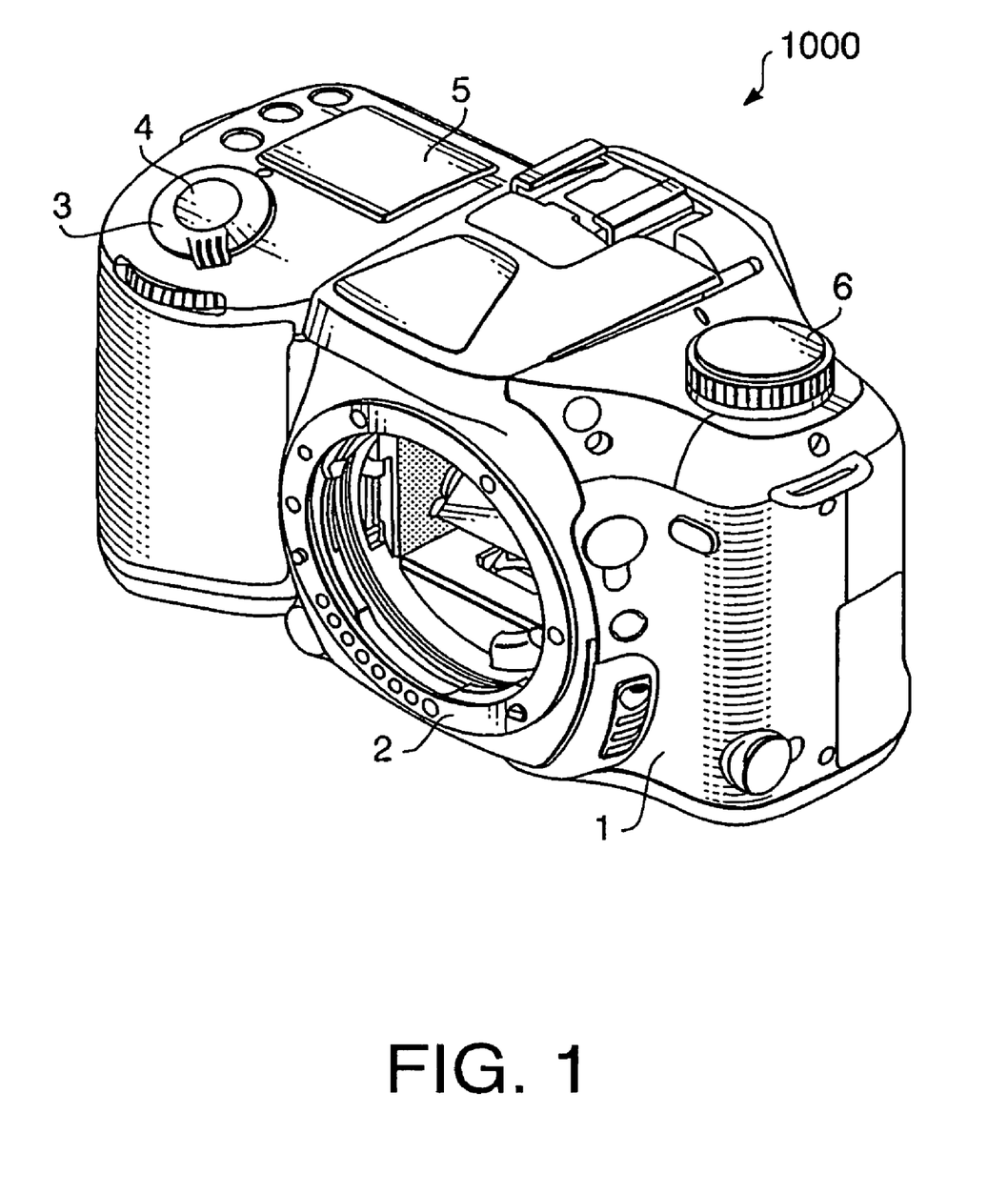
FIG. 1 is a perspective view showing an appearance of a digital camera according to an embodiment of the present invention.

FIG. 1 is a perspective view showing an appearance of a digital camera according to an embodiment of the present invention. The digital camera 1000 is a digital SLR camera employing interchangeable lens system. As shown in FIG. 1, the camera 1000 has a camera body 1. On a front surface of the camera body 1, a lens mount 2 is provided, to which a photographing lens unit (not shown) is detachably attached. On the upper surface of the camera body 1, a main switch 3 having a rotary lever, a release button 4 to be pressed, an LCD (liquid crystal display) 5 for displaying various information and captured images, and a mode dial 6 for setting various photographing modes are provided. The release button 4 functions as a photometry switch when half-depressed and a release switch when fully depressed. Further, a user can select to have the digital camera 1000 in anti-vibration via the mode dial 6.

Figure 2:
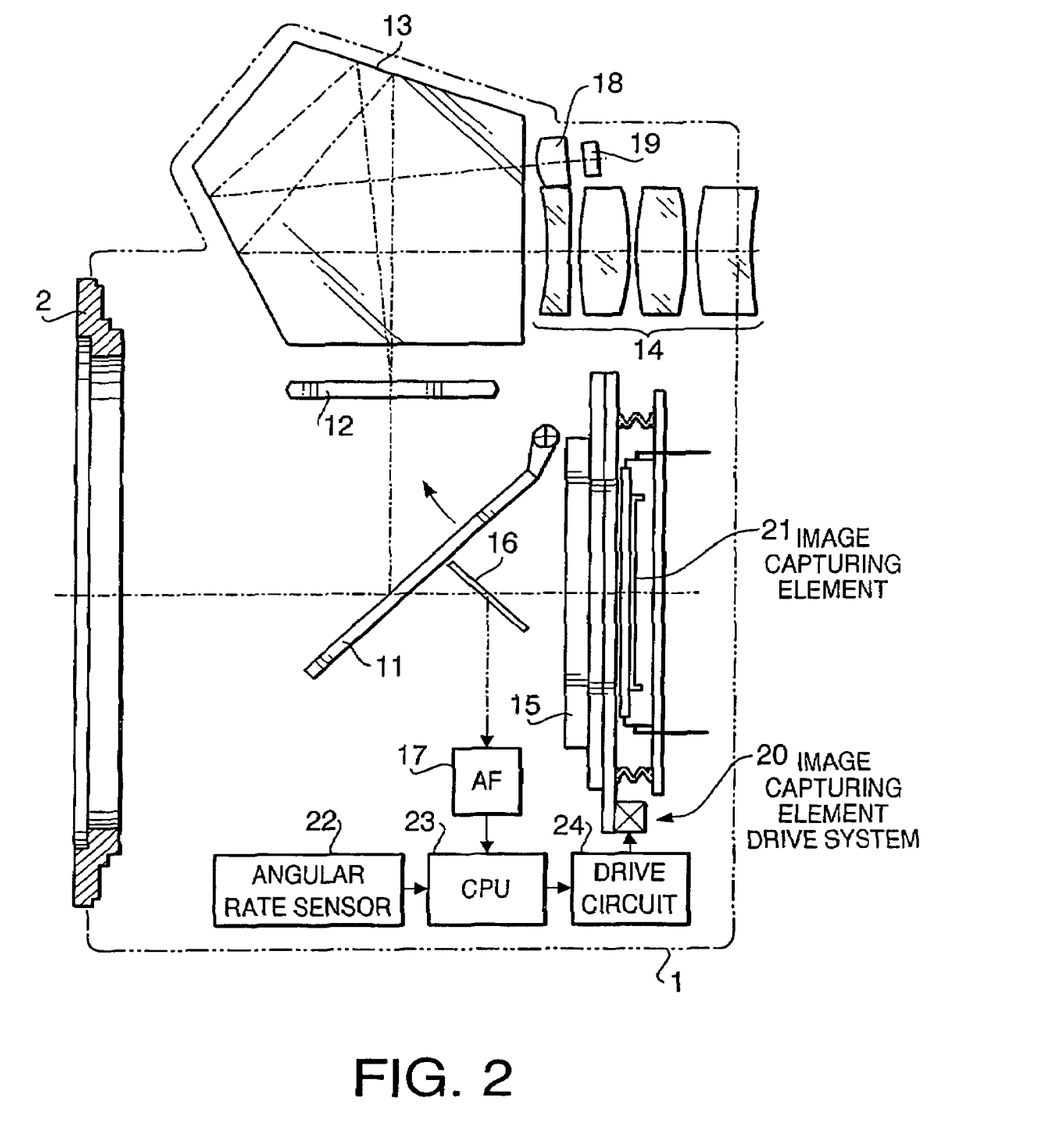
FIG. 2 is a cross-sectional side view showing an internal structure of the digital camera according to the embodiment of the present invention.

FIG. 2 is a cross-sectional side view showing an internal structure of the digital camera according to the embodiment of the present invention. Light from an object passed through the photographing lens unit (not shown) is reflected by a movable half mirror (quick return mirror) 11 and forms an image on a focusing glass 12. The image formed on the focusing glass 12 is further reflected inside a pentaprism 13 and can be observed through an eyepiece lens 14. The image is further transmitted, as the movable half mirror 11 is uplifted toward a focusing glass 12, and received by an image capturing area of an image capturing element 21 such as a CCD (Charge Coupled Device) or a MOS (Metal Oxide Semiconductor), which outputs imaging signals representing the received optical image. The image capturing element 21 is adapted to be driven in an X direction (i.e., horizontally) and in a Y direction (i.e., vertically) respectively on a plane that is perpendicular to the optical axis by an image capturing element drive system 20, which will be described hereinbelow.

The image passed through the movable half mirror 11 is further reflected by a second mirror 16 and received by an AF module 17, which serves as a distance measuring device to evaluate a distance to the object. Based on the evaluated distance, a CPU 23 drives an AF motor (not shown), which rotates an AF drive mechanism to control automatic focusing. A photometer 19 that evaluates the amount of the light through a condenser 18 is provided in a vicinity of the eyepiece lens 14.

The camera body 1 is further provided with an angular rate sensor 22, which detects an deviated angle of the optical axis in the X direction and the Y direction (i.e., the amount of the vibration of the camera body in the X direction and the Y direction). Then the angular rate sensor 22 outputs the detected amount of the vibration to the CPU 23, which calculates a distance to drive the image capturing element 21. Based on the calculated distance, a drive circuit 24 that operates the image capturing element drive system 20 is controlled, and thus the vibration of the camera body is compensated.

Figure 3:
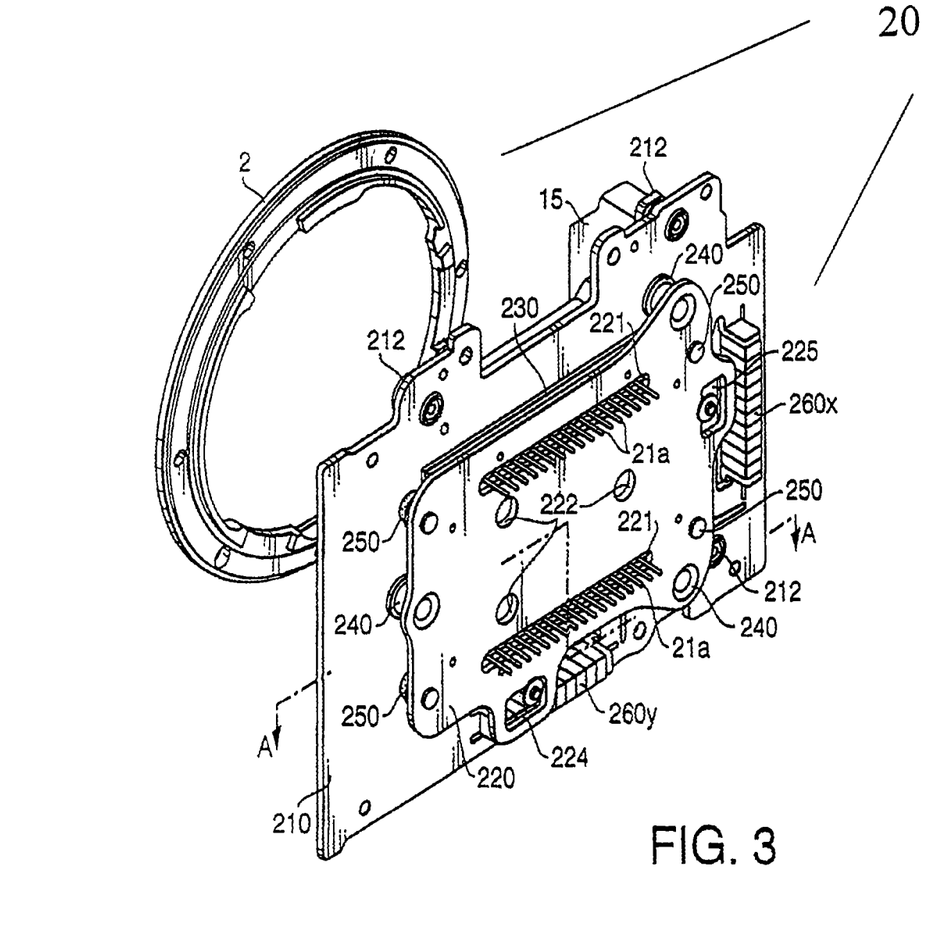
FIG. 3 is a perspective view from a back of an image capturing element drive system according to the embodiment of the invention.
Figure 4:
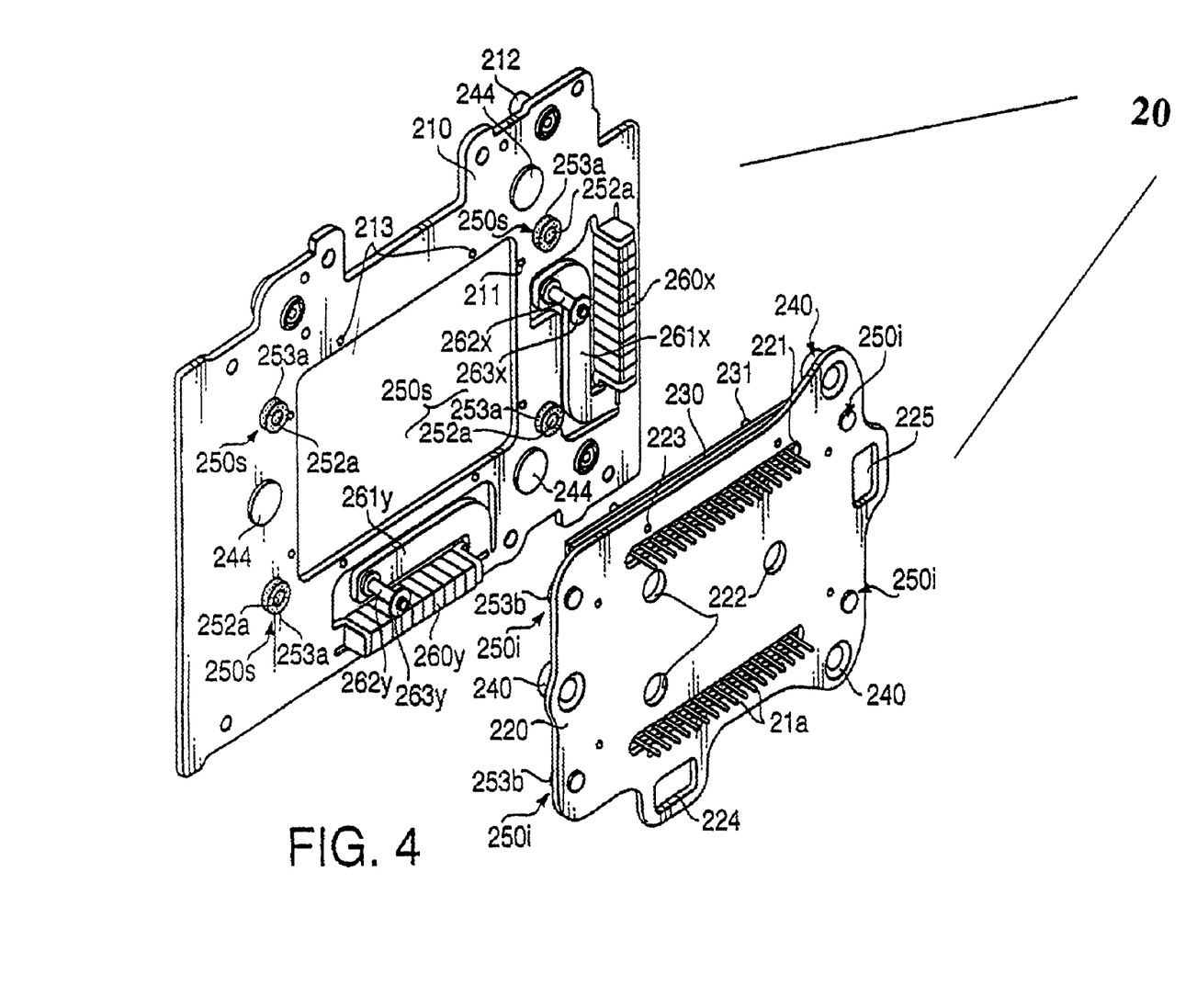
FIG. 4 is an exploded view from a back of the image capturing element drive system according to the embodiment of the invention.
Figure 5:
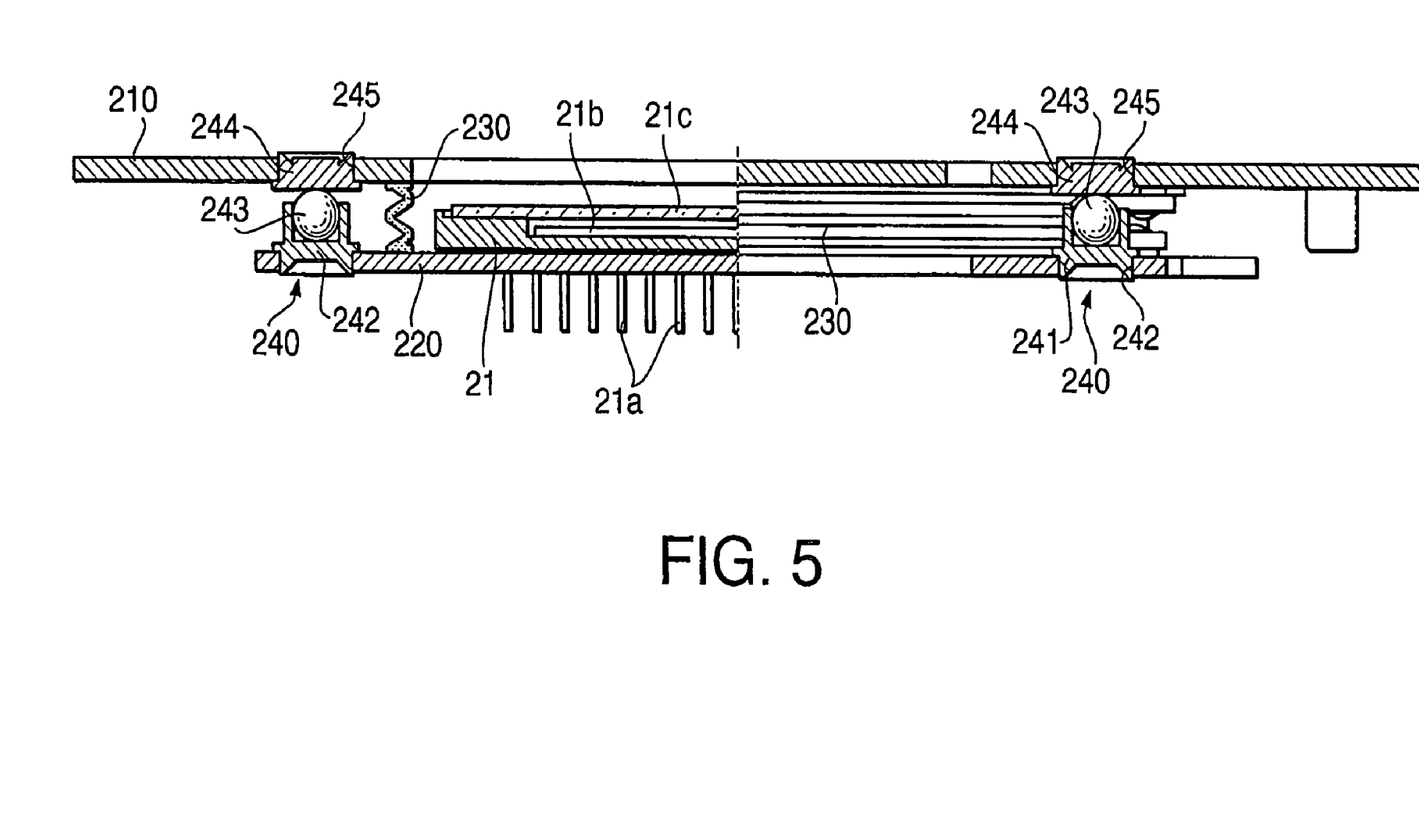
FIG. 5 is a cross-sectional view of the digital camera taken along the line A-A in FIG. 3 according to the embodiment of the invention.

FIG. 3 is a perspective view from a back of the image capturing element drive system 20 with the image capturing element 21 according to the embodiment of the invention. FIG. 4 is an exploded view from a back of the image capturing element drive system 20 according to the embodiment of the invention. FIG. 5 is a cross-sectional view of the digital camera 1000 taken along the line A-A in FIG. 3 according to the embodiment of the invention.

An image capturing element board 220, onto which the image capturing element drive system 20 is installed, is supported by a substrate 210, which forms a chassis of the camera body 1. The image capturing element board 220 is adapted to be driven in the X direction and the Y direction in parallel with a rear surface of the substrate 210, which is perpendicular to the optical axis, inside the camera body 1. The image capturing element 21 includes an image capturing chip 21b, of which a front surface is sealed by a piece of covering glass 21c. A rear surface of the image capturing chip 21b is in contact with a front surface of the of the image capturing element board 220. Leads 21a provided to the image capturing element 21 are configured to penetrate through lead holes 221 toward a rear surface of the camera body 1, and thus the image capturing element 21 is fixed to the image capturing element board 220 with adhesive agent injected through three openings 222.

Figure 6:
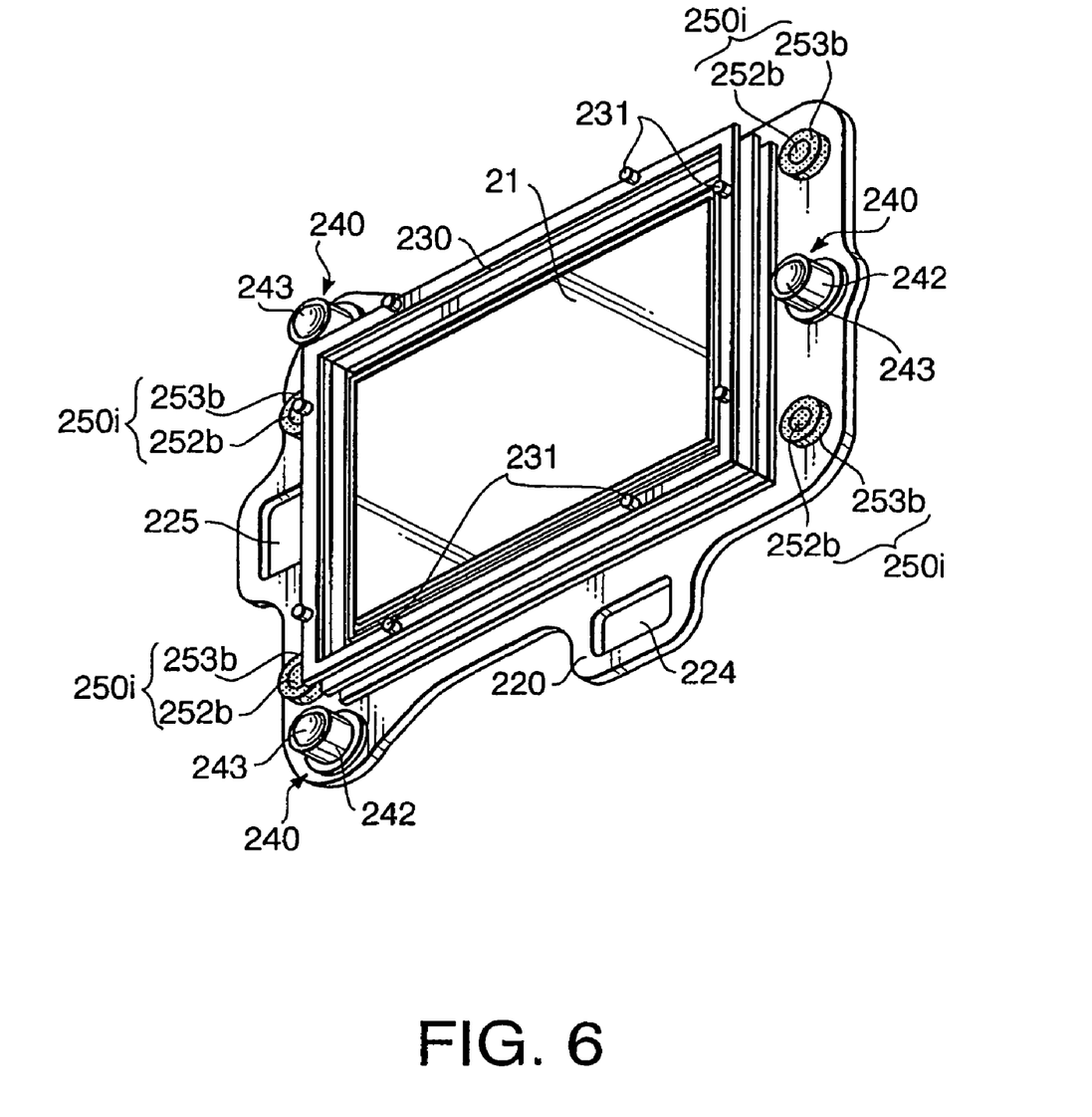
FIG. 6 is an upward view of an image capturing element board of the image capturing element according to the embodiment of the invention.

FIG. 6 is an upward view of the image capturing element board 220 of the image capturing element 21 according to the embodiment of the invention. On the front surface of the image capturing element board 220 is provided with a dust-protective accordion 230 that encloses the image capturing element 21 in a rectangle and shields the same. The accordion 230 is provided with a plurality of protrusions 231 on both a front edge and a rear edge thereof, so that the protrusions 231 on the front edge are engaged with pores 213 that are provided on the rear surface of the substrate 210 and the protrusions 231 on the rear edge are engaged with pores 223 that are provided on the front surface of the image capturing element board 220. Thus, the image capturing element board 220 and the substrate 210 are connected with each other via the accordion 230.

The accordion 230 is made of vibration-proof rubber, that absorbs undesired vibration caused by piezoelectric actuators, which will be described in detail hereinafter. With elasticity of the accordion 230, the image capturing element board 220 is allowed to be driven in the X direction and the Y direction in parallel with the surface of the substrate 210 in a predetermined range.

On a lower side of the image capturing element board 220 and on another side of the image capturing element board 220 that is perpendicular to the lower side (i.e., a left-hand side in FIG. 6), a rectangular Y opening 224 and a rectangular X opening 225 are respectively provided.

The image capturing element board 220 is further provided with a plurality of (for example, three) ball bearings 240 outside the accordion 230. The ball bearings 240 are configured to support the image capturing element board 220 movably in parallel with the rear surface of the substrate 210. Furthermore, a plurality of (for example, four) movable attraction units 250i are provided outside the accordion 230 in a vicinity to each corner of the accordion 230.

Figure 7:
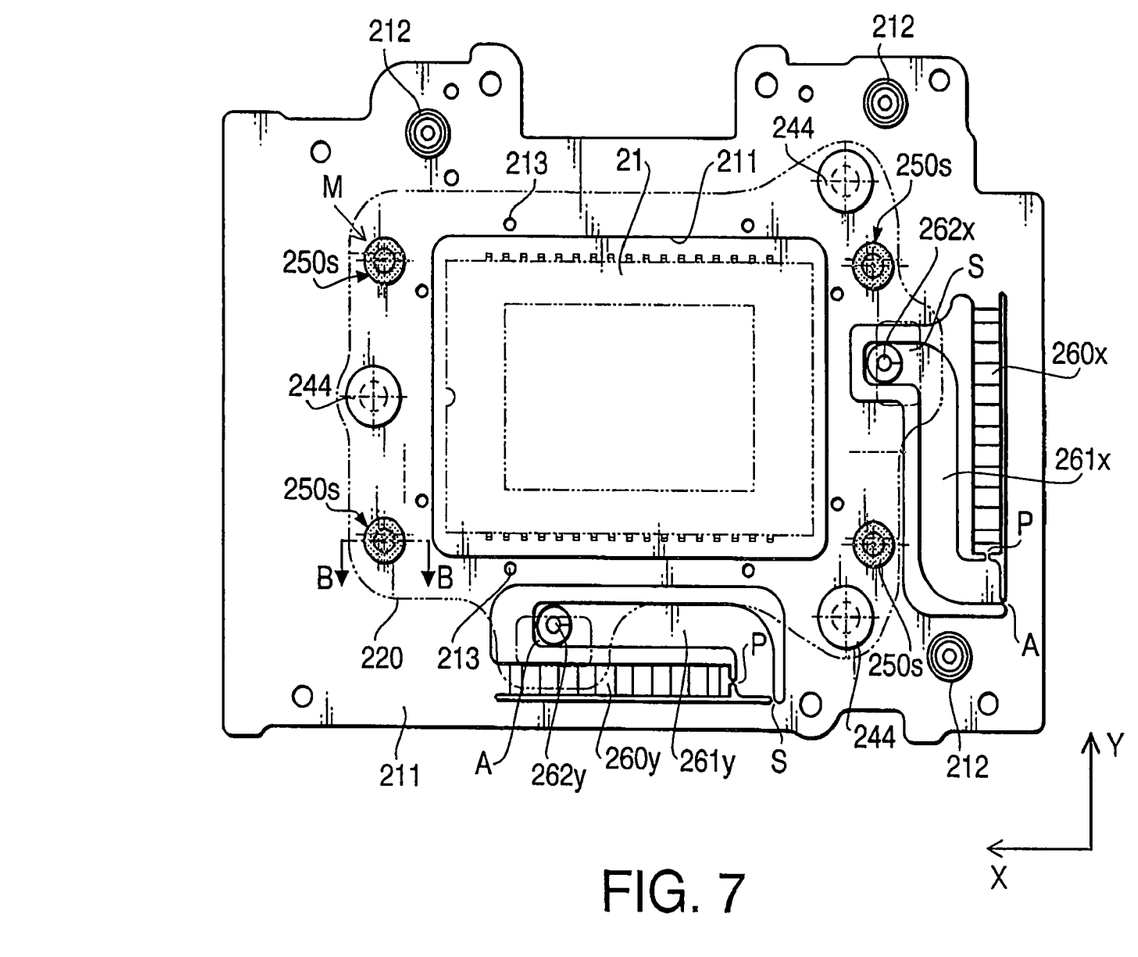
FIG. 7 is a plane view from the back of a substrate of the image capturing element according to the embodiment of the invention.

FIG. 7 is a plane view from the back of the substrate 210 of the image capturing element 21 according to the embodiment of the invention. The substrate 210 is provided with a rectangular aperture 211, which allows the image capturing area of the image capturing element 21 to be exposed, and a shutter unit 15 in front of the aperture 211 that opens and closes to expose and cover the aperture 211. The shutter unit 15 is integrally supported by three shutter supports 212, which are provided around the aperture 211. The shutter unit 15 includes a focal-plane shutter, of which detailed description is omitted.

It should be noted that the substrate 210 is provided with a plurality of (for example, four) fixed attraction units 250s, which are in similar configuration to the movable attraction units 250i of the image capturing element board 220, in a vicinity to each corner of the aperture 211. Each of the fixed attraction units 250s and movable attraction units 250i is magnetic and is adapted to work in corporation with each other so that the image capturing element board 220 can be moved in parallel with the rear surface of the substrate 210 in the X direction and the Y direction by the magnetic force.

Figure 8:
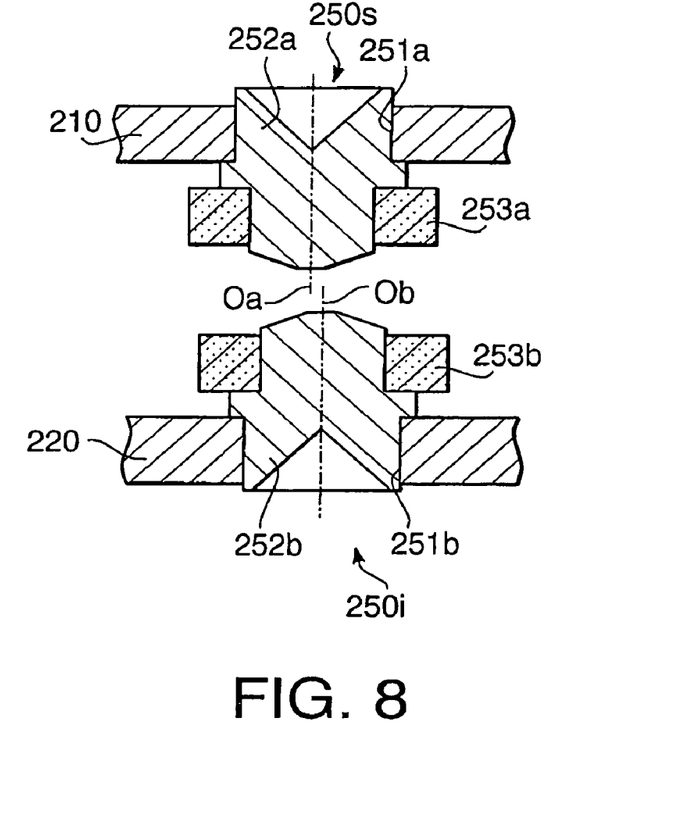
FIG. 8 is a cross-sectional view of enlarged attraction units taken along the line B-B in FIG. 7 according to the embodiment of the invention.

FIG. 8 is a cross-sectional enlarged view of the movable attraction units 250i and the fixed attraction units 250s taken along the line B-B in FIG. 7 according to the embodiment of the invention. The substrate 210 is provided with a through hole 251a, in which a magnetic yoke 252a is embedded, and the image capturing element board 220 is provided with a through hole 251b, in which a magnetic yoke 252b is embedded. Each of the yokes 252a, 252b is provided with annular permanent magnets 253a, 253b, such as neodymium magnets, for example. When the substrate 210 and the image capturing element board 220 are arranged correctly in place to face each other, the permanent magnets 253a of the fixed attraction units 250s are brought to face the permanent magnets 253b of the movable attraction units 250i, with opposing magnetic poles, for example the south pole of the permanent magnets 253a of the fixed attraction unit 250s and the north pole of the permanent magnets 253b of the movable attraction unit 250i, facing each other. It should be noted that yokes 252a, 252b are adapted to be minutely spaced from each other, and central axes Oa, Ob of each yoke 252a, 252b are arranged to be shifted and not to coincide with each other. In this embodiment, the axis Oa is shifted from the axis Ob in a direction of an arrow M (see FIG. 7), which is at approximately 45 degrees with respect to the directions of both X and Y.

With the above configuration, the image capturing element board 220 is attracted to the substrate 210 as the permanent magnets 253a of the fixed attraction units 250s and the permanent magnets 253b of the movable attraction units 250i are attracted to each other with the magnetic force thereof. Further, due to the shifted positions of the axes Oa, Ob, the image capturing element board 220 is biased in the direction indicated by the arrow M in FIG. 7.

In addition to the above-described configuration, the image capturing element board 220 is provided with the three ball bearings 240 outside the accordion 230. Each of the three ball bearings 240 includes a sleeve 242, which is embedded to a hole 241 of the image capturing element board 220. The sleeve 242 holds a ball 243 therein, which is allowed to roll inside the sleeve 242.

Meanwhile, the substrate 210 is provided with three holes 245 at three positions that correspond to positions of the ball bearings 240 of the image capturing element board 220 when the image capturing element board 220 is arranged in place to oppose to the substrate 210, and each of the holes 245 is embedded with a ball receive 244, which is to be in contact with the ball 243 (see FIG. 5). The ball receive 244 is formed with a circular plate, and the ball 243 is adapted to be rolled thereon. With this configuration, the image capturing element board 220 is allowed to be shifted in parallel with the substrate 210 while space between the image capturing element board 220 and the substrate 210 (i.e., a diameter of the ball 243) is maintained constant. It should be noted that surfaces of the ball 243 and the ball receive 244 are precisely processed, so that the space and the parallel between the image capturing element board 220 and the substrate 210 are maintained steady. It should be also noted that the balls 243 are in rolling contact with the substrate 210, thus the image capturing element board 220 can be moved promptly with respect to the substrate 210.

Furthermore, on a lower side of the substrate 210 and on another side of the substrate 210 that is perpendicular to the lower side (i.e., a right-hand side in FIG. 7), the Y laminated piezoelectric actuator 260y and X laminated piezoelectric actuator 260x are respectively provided. The X laminated piezoelectric actuator 260x is fixed to the substrate 210 at one end, and the other end, which is adapted to be elongated and contracted by voltage applied, is connected to a displacement magnifying link 261x. Similarly, the Y laminated piezoelectric actuator 260y is fixed to the substrate 210 at one end, and the other end, which is adapted to be elongated and contracted by voltage applied, is connected to a displacement magnifying link 261y.

Each of the displacement magnifying links 261x, 261y is cutout from the substrate 210 to have a cranked shape, and is provided with a supporting point S and a pressure point P at one end thereof that is closer to the laminated piezoelectric actuators 260x, 260y respectively. Each of the displacement magnifying links 261x, 261y is connected to the laminated piezoelectric actuators 260x, 260y respectively at the pressure point P thereof, and is connected to the substrate 210 at the supporting point S. The other end of each of the displacement magnifying links 261x, 261y includes a point of action A, and is respectively provided with the pins 262x, 262y that penetrate through the X opening 225 and the Y opening 224 of the image capturing element board 220. Tip ends of the pins 262x, 262y are provided with stopper rings 263x, 263y, so that the pins 262x, 262 can be maintained in the openings 225, 224.

With the above-described configuration, the laminated piezoelectric actuators 260x, 260y are adapted to be contracted when no voltage is applied (i.e., a normal state). When predetermined voltage is applied, the laminated piezoelectric actuators 260x, 260y are adapted to be elongated based on a level of the voltage.

It should be noted that while the image capturing element board 220 is biased to the substrate 210 by the magnetic force of the attraction units 250i, 250s in the direction of M in FIG. 7, the pins 262x, 262y are respectively in contact with inner edges of the openings 225, 224 of the image capturing element board 220 that are opposite from edges in the direction M of the openings 225, 224.

Figure 9:
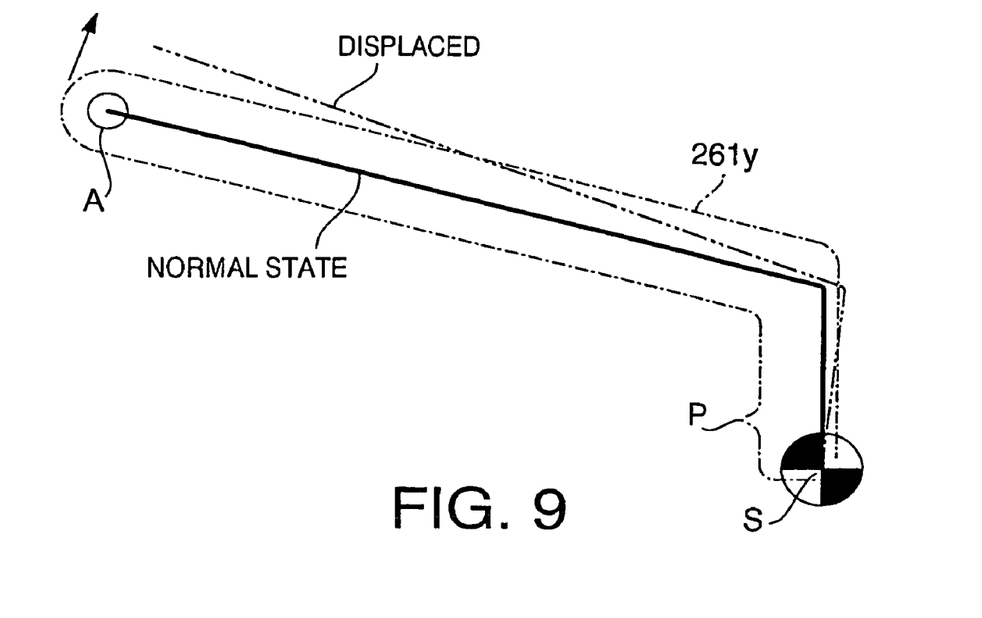
FIG. 9 is an illustrating view of a displacement magnifying mechanism of a laminated piezoelectric actuator according to the embodiment of the invention.

FIG. 9 is an illustrating view of a mechanism of the displacement magnifying link 261y of the Y laminated piezoelectric actuator 260y according to the embodiment of the invention. With the above-described configuration, the Y laminated piezoelectric actuator 260y, for example, is elongated when the predetermined voltage is applied to the Y laminated piezoelectric actuator 260y. Then, the pressure point P of the Y displacement magnifying link 261y is displaced toward right-hand side in FIG. 9, and the Y displacement magnifying link 261y is lifted upwardly as indicated by an arrow for a small angle supported by the supporting point S. As a result, the point of action A of the Y displacement magnifying link 261y is displaced upwardly (i.e., in the Y direction) with the amount of the displacement of the point of action A being magnified by leverage. With this action, the pin 262y that is provided to the Y displacement magnifying link 261y at a position corresponding to the point of action A presses the inner edge of the opening 224 upwardly in the Y direction to drive the image capturing element board 220 against the magnetic attraction in the M direction of the attraction unit 250i. It should be noted that the displacement magnifying link 261x of the X laminated piezoelectric actuator 260x acts in a similar mechanism to the displacement magnifying link 261y of the Y laminated piezoelectric actuator 260y, i.e., the image capturing element board 220 is driven sidewardly in the X direction by predetermined voltage being applied to the X laminated piezoelectric actuator 260x.

With the above-described configuration, the image capturing element 21 can be driven in the X direction and the Y direction for an arbitrary amount according to the level of the voltage applied. It should be noted that the drive force of the displacement is caused by elongation and contraction of the laminated piezoelectric actuators 260x, 260y, therefore the image capturing element board 220 can be displaced in a prompt operation.

With the above-described image capturing element drive system 20, the angular rate sensor 22 of the digital camera 1000 is adapted to detect a deviated angle in the X direction and the Y direction caused by a vibration when hand movements occur during photographing, and output the detected amount of the vibration to the CPU 23, which calculates a distance to drive the image capturing element 21 (see FIG. 2). Based on the calculated distance, the CPU 23 calculates the voltage to be applied to the laminated piezoelectric actuators 260x, 260y, and controls the drive circuit 24 to apply the voltage. The laminated piezoelectric actuators 260x, 260y are then elongated based on the level of the voltage, and the pins 262x, 262y are displaced via the displacement magnifying links 261x, 261y, respectively. With this operation, the image capturing element board 220 is driven in the X direction and the Y direction against the magnetic force of the attraction units 250i, 250s, and the image capturing element 21 is driven in the X direction and the Y direction with respect to the optical axis, thus the vibration of the camera body 1 is compensated.

It should be noted that when the image capturing element board 220 is driven in the X direction and the Y direction, the image capturing area of the image capturing element 21 is not displaced in the direction of the optical axis, as the image capturing element board 220 is driven in parallel with the rear surface of the substrate 210 with the structure of the ball bearings 240. Therefore, an image captured on the image capturing area of the image capturing element 21 can be maintained focused even when the image capturing element board 220 is displaced to compensate the vibration.

It should be further noted that the laminated piezoelectric actuators 260x, 260y are adapted to drive the image capturing element board 220 only in directions that are against the attraction in the M direction. In other words, when the image capturing element board 220 is to be driven in the directions that are along the attraction in the M direction, the laminated piezoelectric actuators 260x, 260y can be simply released from the voltage being applied, so that the image capturing element board 220 is attracted to the substrate 210 with the magnetic attraction of the attraction units 250i, 250s in the M direction. Thus, the drive mechanism of the image capturing element board 220 is controlled in a less complicated manner.

It should be also noted that the image capturing element board 220 is driven on the balls 243 that are in rolling contact with the substrate 210, thus the image capturing element board 220 can be driven promptly and steadily to a targeted position with respect to the substrate 210.

Further, the image capturing element board 220 is connected to the substrate 210 with the dust-protective accordion 230 made of vibration-proof rubber. Therefore, the vibration caused by the image capturing element board 220 being driven are absorbed, and the image capturing element board 220 can be stopped promptly and steadily at the targeted position.

Furthermore, as the image capturing element 21 is enclosed with the dust-protective accordion 230, dirt and dust floating around the surrounding components, including the ball bearings 240, the attraction units 250i, 250s, the laminated piezoelectric actuators 260x, 260y, and the displacement magnifying links 261x, 261y, are not allowed to stick to the image capturing area or the image capturing element 21.

With the above-described configuration of the image capturing element drive system 20, the digital camera 1000 capable of compensating vibration caused by hand movements promptly and focusing properly in a compact configuration can be obtained.

It should be noted that, in the present embodiment, the image capturing element board 220 is biased in the M direction by utilizing the magnetic force of the attraction units 250i, 250s, however, the image capturing element board 220 may be biased by other attraction structure, including a spring.

It should be further noted that, the laminated piezoelectric actuators 260x, 260y may be replaced with single piezoelectric actuators, as long as the single piezoelectric actuators are capable of being elongated and contracted for an enough range to drive the displacement magnifying links.

In the above-described embodiment, the present invention is applied to a digital SLR camera. However, the invention is not limited to such a camera, but digital cameras having an anti-vibration control by driving the image capturing element can employ the invention.

The present disclosure relates to the subject matter contained in Japanese Patent Application No. 2005-013881, filed on Jan. 21, 2005, which is expressly incorporated herein by reference in its entirety.

What is claimed is:

1. A digital camera, comprising:
   a detecting system to detect a vibration that occurs in a camera body, and
   an image capturing element drive system, which is adapted to adjust a position of an image capturing element based on an amount of the vibration detected with respect to an optical axis of the camera body, wherein the image capturing element drive system includes a substrate, of which surface is perpendicular to the optical axis, an image capturing element board, which has the image capturing element thereon and is adapted to be driven in parallel with the surface of the substrate with a plurality of rolling support systems provided to the image capturing element board, a biasing system, which is adapted to bias the image capturing element board in a predetermined direction, and a drive system, which is adapted to drive the image capturing element board against biasing force of the biasing system, wherein the biasing system includes a pair of magnets, each of which is provided to the substrate and the image capturing element board, and is arranged in an opposed position to each other, wherein the magnets generate the biasing force, which is one of force to attract each other and force to repel each other, and wherein one of the magnets is arranged in a position that is shifted in the predetermined direction with respect to the other of the magnets.

2. The digital camera according to claim 1,
wherein each of the rolling support systems includes a ball bearing, which is supported by one of the substrate and the image capturing element board, the ball bearing having a ball that is in rolling contact with the other of the substrate and the image capturing element board.

3. The digital camera according to claim 1,
wherein the biasing system is adapted to generate the biasing force in an oblique direction with respect to a horizontal direction and to a vertical direction of the camera body, and
wherein the drive system includes a pair of actuators that are adapted to drive the image capturing element board in the horizontal direction and in the vertical direction respectively.

4. The digital camera according to claim 3,
wherein each of the pair of actuators is installed on the substrate and formed with a plurality of piezoelectric actuators, and
wherein each of the pair of actuators is connected to the image capturing element board via a displacement magnifying link.

5. The digital camera according to claim 4, wherein the displacement magnifying link is formed with a cutout portion of the substrate.

6. A digital camera, comprising:
a detecting system to detect a vibration that occurs in a camera body, and
an image capturing element drive system, which is adapted to adjust a position of an image capturing element based on an amount of the vibration detected with respect to an optical axis of the camera body,
wherein the image capturing element drive system includes a substrate, of which surface is perpendicular to the optical axis, an image capturing element board, which has the image capturing element thereon and is adapted to be driven in parallel with the surface of the substrate with a plurality of rolling support systems provided to the image capturing element board, a biasing system, which is adapted to bias the image capturing element board in a predetermined direction, and a drive system, which is adapted to drive the image capturing element board against biasing force of the biasing system,
wherein the image capturing element board is provided with a dust-protection member made of vibration-proof material, and
wherein the dust-protection member is arranged to enclose the image capturing element therewith and to exclude the rolling support system and the biasing system therefrom.

7. The digital camera according to claim 6,
wherein the dust-protection member is configured to connect the image capturing element board and the substrate, and to be elastically deformed to have the image capturing element board driven in parallel with the surface of the substrate.

8. An image capturing element drive system for an optical device, which is adapted to adjust a position of an image capturing element of the device based on an amount of a vibration detected in the device with respect to an optical axis of a device body, comprising:
a substrate, of which surface is perpendicular to the optical axis,
an image capturing element board, which has the image capturing element thereon and is adapted to be driven in parallel with the surface of the substrate with a plurality of rolling support systems provided to the image capturing element board, and
a biasing system, which is adapted to bias the image capturing element board in a predetermined direction, and a drive system, which is adapted to drive the image capturing element board against biasing force of the biasing systems
wherein the biasing system includes a pair of magnets, each of which is provided to the substrate and the image capturing element board, and is arranged in an opposed position to each other,
wherein the magnets generate the biasing force, which is one of force to attract each other and force to repel each other, and
wherein one of the magnets is arranged in a position that is shifted in the predetermined direction with respect to the other of the magnets.

9. The image capturing element drive system according to claim 8,
wherein each of the rolling support systems includes a ball bearing, which is supported by one of the substrate and the image capturing element board, the ball bearing having a ball that is in rolling contact with the other of the substrate and the image capturing element board.

10. The image capturing element drive system according to claim 8,
wherein the biasing system is adapted to generate the biasing force in an oblique direction with respect to a horizontal direction and to a vertical direction of the device body, and
wherein the drive system includes a pair of actuators that are adapted to drive the image capturing element board in the horizontal direction and in the vertical direction respectively.

11. The image capturing element drive system according to claim 10,
wherein each of the pair of actuators is installed on the substrate and formed with a plurality of piezoelectric actuators, and
wherein each of the pair of actuators is connected to the image capturing element board via a displacement magnifying link.

12. The image capturing element drive system according to claim 11, wherein the displacement magnifying link is formed with a cutout portion of the substrate.

13. An image capturing element drive system for an optical device, which is adapted to adjust a position of an image capturing element of the device based on an amount of a vibration detected in the device with respect to an optical axis of a device body, comprising:
- a substrate, of which surface is perpendicular to the optical axis,
- an image capturing element board, which has the image capturing element thereon and is adapted to be driven in parallel with the surface of the substrate with a plurality of rolling support systems provided to the image capturing element board, and
- a biasing system, which is adapted to bias the image capturing element board in a predetermined direction, and a drive system, which is adapted to drive the image capturing element board against biasing force of the biasing system, wherein the image capturing element board is provided with a dust-protection member made of vibration-proof material, and wherein the dust-protection member is arranged to enclose the image capturing element therewith and to exclude the rolling support system and the biasing system therefrom.

14. The image capturing element drive system according to claim 13, wherein the dust-protection member is configured to connect the image capturing element board and the substrate, and to be elastically deformed to have the image capturing element board driven in parallel with the surface of the substrate.

* * * * *